United States Patent [19]

Hottle

[11] 3,759,394

[45] Sept. 18, 1973

[54] TIRE SUPPORTING DEVICE

[76] Inventor: Dwight E. Hottle, 2866 Lakeland Pky., Stow, Ohio 44224

[22] Filed: Jan. 31, 1972

[21] Appl. No.: 222,092

[52] U.S. Cl. .............................................. 211/23
[51] Int. Cl. ............................................. A47f 7/04
[58] Field of Search ............... 211/23, 24; 156/414, 156/417, 419; 144/288 A; 254/50.1, 50.2, 50.4; 157/1.1, 1.46; 81/15.3

[56] References Cited
UNITED STATES PATENTS
1,577,664  3/1926  Tew .................................. 156/414

FOREIGN PATENTS OR APPLICATIONS
854,214  11/1960  Great Britain ..................... 156/417
110,510  4/1964  Czechoslovakia .................... 211/24

Primary Examiner—Roy D. Frazier
Assistant Examiner—Thomas J. Holko
Attorney—Freeman & Taylor

[57] ABSTRACT

A collapsible tire supporting device to be used for the transportation and/or storage of pneumatic tires principally of the radial ply type. The device includes a pair of opposed end pieces and a cross bar, one end which is secured to one end piece with the other end piece being slidably received thereon. The end pieces are interconnected by a plurality of deformable resilient support members so that upon moving the slidable end piece toward the fixed end piece, the support members will be deformed so as to provide a support for the uncured or "green" tire in the area of the tread and sidewall. Means are provided for limiting the movement of the slidable end piece and also for locking it in its collapsed and deformed position.

5 Claims, 4 Drawing Figures

TIRE SUPPORTING DEVICE

BACKGROUND OF THE INVENTION

This invention, in general, relates to devices for storing or transporting uncured or "green" pneumatic tires and, in particular, relates to a device for supporting an uncured radial ply tire.

DESCRIPTION OF THE PRIOR ART

In the tire-building industry the fairly recent development in which tires are built with radial plies as contrasted to bias plies has given rise to problems in handling uncured tires. In building radial ply tires, these tires are shaped to toroidal configuration in the uncured stage and are then stored and/or transported to the point of curing.

The difficulty which arises is that, contrary to the bias ply tires, radial ply tires must be maintained in very close relationship to their original built condition. Stated otherwise, deformation of the uncured tires can cause defects in the final vulcanized tire.

At the present time conventional conveyor hooks or storage racks, which are designed for and were designed for use with bias-built tires, are being used for storage and transportation. These have proven unsatisfactory with radial tires because they do not support the tire in the tread and sidewall region to avoid the deformation referred to above. The deformation referred to results in defective tires fllowing cure, and at present the only art Applicant is aware of is the conventional conveyor hook or arm of a storage rack or truck.

SUMMARY OF THE INVENTION

It has been discovered that the problem of properly supporting a green or uncured radial ply tire for either storage or transportation purposes can be obviated by providing a collapsible and expandable tire supporting device which, in its uncollapsed and unexpanded condition, permits a toroidally shaped tire to be slipped over it, following which the support device is collapsed and expanded to provide support for the tire in the tread and sidewall regions thereof.

It has been discovered that this can be accomplished by providing a pair of opposed end pieces which are slightly undersized with regard to the diameter of the tire at the bead area and with one of these end pieces being fixed either to a wall, a transportation truck, or a conveyor belt.

It has also been discovered that if a fixed cross arm is secured to this end piece, a second end piece can be slidably placed over the projecting end of the cross bar and the two end pieces can be interconnected by support members such as a plurality of deformable resilient straps of suitable material, such as spring steel, plastic, etc.

With a tire supporting device of this type, the tire can be slipped over the support with one bead resting on the fixed end piece. Following this, sliding movement of the second end piece on the cross arm will cause the resilient support members to buckle and deform inside of the tire so that they will engage the interior of the tire in the tread and sidewall regions, thereby providing a relatively firm and secure support during the period of time the tire is received on the supporting device.

It has also been discovered that provision can be made for locking the movable end piece in a predetermined position On the cross arm. This will insure that the support stays in place until it is desired to remove the tire.

It has also been found that a plurality of locking members can be provided so that, depending upon the degree of compression or the distance of movement of the movable end piece, different size tires can be supported.

Accordingly, production of a tire supporting device of the character described becomes the principal object of this invention, with other objects thereof becoming more apparent upon a reading of the following brief specification considered and interpreted in view of the accompanying drawings.

OF THE DRAWINGS

DESCRIPTION OF THE PREFERRED EMBODIMENT

Figure 1:
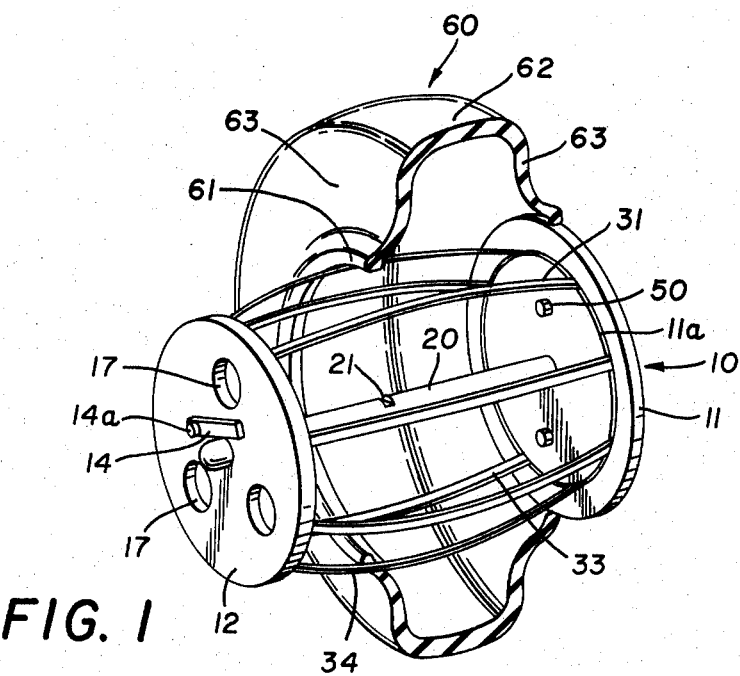
FIG. 1 is a perspective view, partially in section, showing a tire in place on the expanded tire supporting device.

Turning first to FIG. 1, it will be noted that the tire supporting device, generally indicated by the numeral 10, includes a pair of opposed end pieces 11 and 12, a cross arm 20, and a plurality of flexible support members 31 and 32, 33 and 34.

Figure 3:
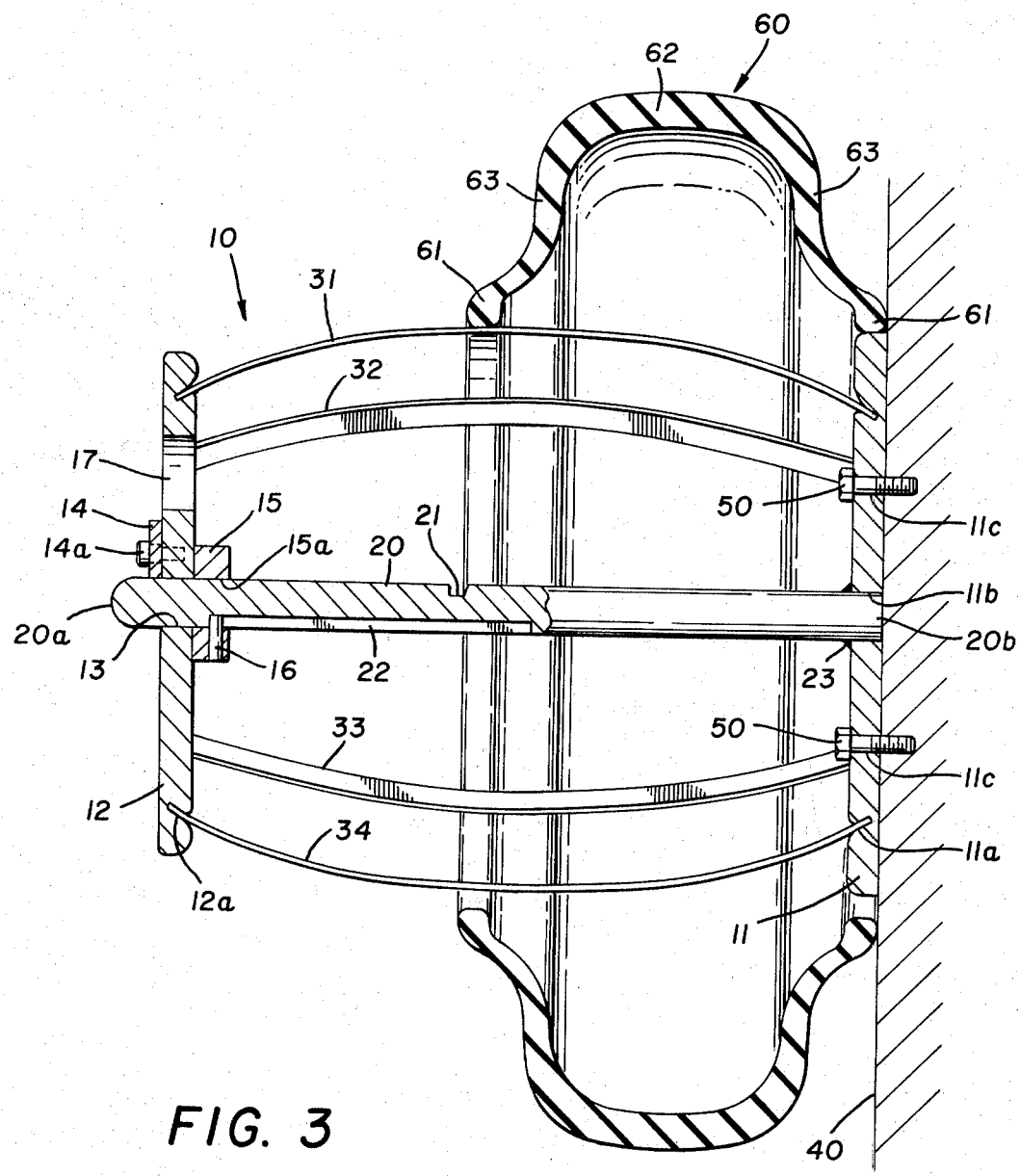
FIG. 3 is an elevational sectional view showing the tire supporting device in uncollapsed condition.

Considering FIG. 3, for example, for a more detailed description of the first end piece 11, it will be noted that this is basically a flat circular disc whose circumference substantially approximates the internal circumference of the tire in the bead area thereof.

The end piece 11 has a circumferential groove or notch 11a in one face thereof spaced from the periphery, and this groove is inclined at an angle with respect to the plane of the face of the end piece for purposes which Will be described in greater detail below.

Referring particularly to FIG. 3, it will be noted that this first end piece 11 is mounted on a wall 40, with it being understood that the supporting or mounting surface 40 could be anything including a truck or other vehicle and is being illustrated as a wall for purposes of illustration only. Additionally, while the device is mounted on a vertical surface, it is believed apparent that the device could be mounted on a horizontal surface without lessening its effectiveness.

The first end piece 11 also has a plurality of through openings 11c, 11c and a central opening 11b. Screws or bolts 50,50 are passed through the openings 11c, 11c and are secured to the supporting surface 40. In this regard two such openings and two such bolts or screws are illustrated, but it is believed apparent that any number could be utilized and also that other suitable means of mounting end piece 11 could be utilized.

Received within the bore 11b of first end piece 11 is one end 20b of cross bar 20, as clearly Shown in FIG. 3. The cross bar 20 is illustrated as being welded in place as at 23, but could be secured in any desired fashion including threading.

The cross arm 20 is elongate in nature and also has an outboard end 20a, a radially extending notch 21, and a keyway 22 therein.

Received over the outboard end 20a of the cross arm 20 is second end piece 12 which is similar in construction to the first end piece 11, although illustrated as being slightly smaller in diameter to facilitate slipping the tire 60 over end piece 12 and onto the supporting device as shown in FIG. 3.

Second end piece 12 is again a circular plate having a circumferential groove 12a therein and also a through bore 13. The through bore 13 slips over the outboard end 20a of cross bar 20 and is slidably received thereon as noted above.

A support plate 15 with a central aperture 15a is mounted on the inboard surface of the end piece 12 and carries with it a dowel or peg 16 which rides in the keyway 22 of the cross arm. This dowel, in combination with the keyway 22, limits the travel of the end piece 12 and prohibits, on the one hand, complete disengagement of the end piece 12 from the cross arm 20 and, on the other hand, too great a degree of compression toward end piece 11.

A series of holes 17,17 are also contained in end piece 12 and, while these have the usual lightening effect, they also can be utilized as gripping surfaces to pull the supporting device back to the condition of FIGS. 1 and 3 following use if desired and if found necessary.

Also, on the outboard face of end piece 12, a locking arm 14 is pivotally mounted as at 14a for purposes which will be described below.

Interconnecting end pieces 11 and 12 are a plurality of deformable, resilient members 31, 32, 33, and 34, of any desired number which have their opposed ends received in the circumferential grooves 11a and 12a of the end pieces.

It should be noted here that these are simply shown as being press fit into the grooves, but it should be understood that they could be secured in place by any desired means, including gluing, stapling, etc. It is also apparent that the supporting members could alternatively be secured to the peripheral edges of the end pieces rather than on the flat faces thereof as shown in the preferred embodiment.

Furthermore, it should be noted that the support members 31, 32, 33, and 34 have been illustrated as flat straps. These members could be made out of any resilient, deformable material which has a memory, such as for example spring steel, plastic, or any suitable material that has the required deformation characteristics but also has the strength properties necessary to support the tire. Furthermore, while straps have been illustrated, the support members are not intended to be so limited and could be round spring wire anchored in holes rather than straps which have their ends received in the circumferential grooves of the end pieces. The important thing is that they be deformable, resilient, and strong enough to support the tire.

In use or operation of the improved tire supporting device, it will first be assumed that the tire has been slipped over the supporting device, as shown in FIGS. 1 and 3, with one bead 61 resting on the periphery of the first end piece 11 and the other bead resting on one or more of the straps.

Figure 2:
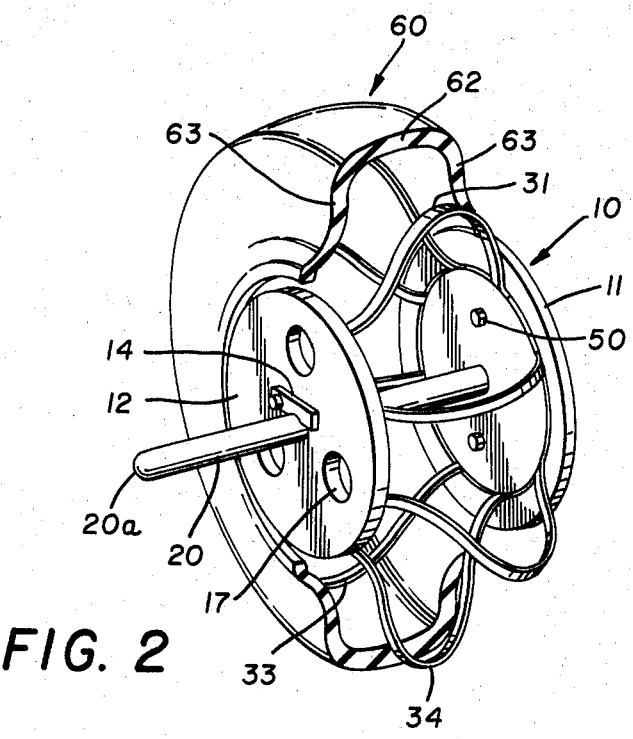
FIG. 2 is a perspective view similar to FIG. 1 showing the supporting device in collapsed, supporting position.
Figure 4:
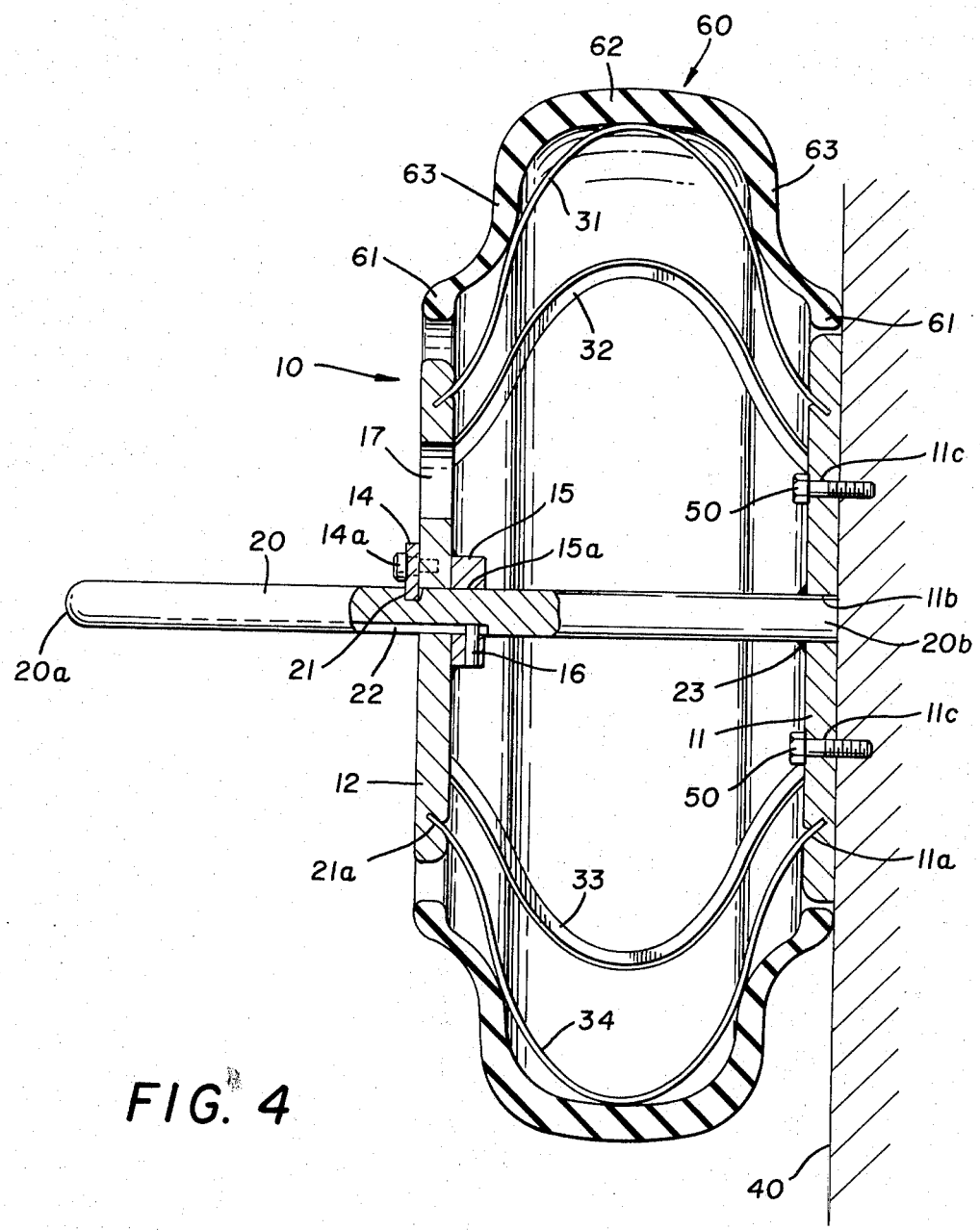
FIG. 4 is a sectional view, similar to FIG. 3, but showing the tire supporting device in collapsed condition.

Following this, it will be necessary to move the second end piece 12 to the right of FIG. 3, for example, to the position of FIG. 4. At this time the locking member 14 will drop into the notch 21 and hold the device in the collapsed position. Also at this time, and as clearly shown in FIGS. 2 and 4, the straps will bend and deform due to the inclination of the grooves 11a, 12a so that they support the tire 60 in the tread region 62 and the sidewall regions 63, 63. In this fashion the tire will retain its original built configuration notwithstanding long periods of Storage. 17

It is to be understood that additional notches 21 could be provided in cross arm 20 so that different size tires could be accommodated depending upon the degree of movement of end piece 12 toward end piece 11.

To remove the tire, it is merely necessary to pivot the locking member 14 out of the notch 21 and pull the end piece 12 to the left to the condition of FIG. 3, following which the tire can be removed.

It has, therefore, been shown how an uncured pneumatic tire can be fully supported during storage or transportation by means of a simple, economical, yet effective supporting device so that the tire can be maintained substantially in its desired configuration notwithstanding long periods between building and curing.

It should be understood that while certain characteristics have been set forth for the materials of the resilient support members, no other limitations as to materials are intended.

Furthermore, while beads 61, 61 are shown slightly spaced from the peripheries of end pieces 11 and 12 when the device is in supporting condition, support in the bead region could also be provided by altering the size of the end pieces.

Accordingly, while a full and complete description of the invention has been set forth in accordance with the dictates of the Patent Statutes, it is understood that modifications may be resorted to without departing from the spirit hereof or the scope of the appended claims.

Thus, while only one cross arm 20 is illustrated, it is believed apparent that more than one could be utilized if required, with operation of the device, of course, remaining the same. Furthermore, while the end pieces 11 and 12 have been shown as being circular in planar configuration, it is not absolutely necessary that they be round, and they could take any desired planar configuration.

Finally, while the support members, which are illustrated as straps, are shown in FIG. 4 as supporting the tire in both the sidewall and tread region, it is believed possible to adequately support the tire only in the sidewall region.

What is claimed is:

1. A pneumatic tire supporting, storing and transporting device, comprising;
   A. first and second opposed, unitary end pieces;
   B. said first end piece being fixed and said second end piece being movable relatively of said first end piece;
   C. at least one elongate cross bar having one end non-rotationally secured to said first end piece;
   D. said second end piece being slidably received on the opposed end of said cross bar for sliding movement toward and away from said first end piece;
   E. a plurality of resilient support members secured to and interconnecting said opposed end pieces and being radially deformable upon sliding movement of said second end piece toward said first end piece while being fixed with respect to the circumference of said end pieces;

F. locking means releasably retaining said second end piece in position on said cross bar following movement thereof toward said first end piece; and
G. means for limiting the amount of travel of said second end piece including
 1. an elongate keyway on said cross bar and
 2. stop means carried by said second end piece and engaging said keyway.

2. The device of claim 1 wherein said support members include a plurality of elongate metal straps engaging the opposed inner faces of said first and second end pieces.

3. The device of claim 1 wherein said support members include a plurality of elongate straps engaging the opposed inner faces of said first and second end pieces.

4. The device of claim 1 further characterized by the fact that each of said end pieces has a circumferential groove in their opposed inner faces; said support members having their opposed ends received within said grooves.

5. The device of claim 1 further characterized by the fact that said locking means include
 A. at least one notch in said cross bar and
 B. a locking arm carried by said second end piece and adapted to releasably engage said notch.

* * * * *